LITHIUM-SILVER MOLYBDATE

LITHIUM-COBALT MOLYBDATE

LITHIUM-NICKEL MOLYBDATE

LITHIUM-LEAD MOLYBDATE
@ 20.8 HRS.
88.6 %

LITHIUM-BISMUTH MOLYBDATE
@ 24.1 HRS
90.7 %

United States Patent Office 3,822,148
Patented July 2, 1974

3,822,148
LITHIUM-METAL MOLYBDATE ORGANIC ELECTROLYTE CELL
Arabinda N. Dey, Needham, and Robert W. Holmes, Dedham, Mass., assignors to P. R. Mallory & Co., Inc., Indianapolis, Ind.
Continuation of application Ser. No. 54,931, July 15, 1970, now Patent No. 3,711,334. This application May 15, 1972, Ser. No. 254,332
Int. Cl. H01m 13/00
U.S. Cl. 136—83
12 Claims

ABSTRACT OF THE DISCLOSURE

This invention relates to a novel primary electric cell comprising positive electrodes composed of any of the molybdates of silver, iron, cobalt, nickel, mercury, thallium, lead, bismuth and their mixtures, negative electrodes composed of any of the light metals such as Li, Na, K, Ca, Be, Mg and Al, said electrodes being disposed in an electrolyte comprising an organic solvent selected from the group consisting of tetrahydrofuran, N-nitrosodimethylamine, dimethyl sulfite, propylene carbonate, gamma-butyrolactone, dimethyl carbonate, dimethoxy ethane, acetonitrile, dimethyl sulfoxide, dimethyl formamide and the mixtures thereof, and having dissolved therein soluble salts of the light metals, for example, the perchlorates, hexafluorophosphates, tetrafluoroborates, tetrachloroaluminates, hexafluoroarsenates of lithium.

---

Prior to the present invention, it was believed that the metal salts of the oxyacids of molybdenum could not be used as depolarizers in organic electrolyte-light metal anode batteries. It has been found, however, by the present invention, that this is not so. Cells utilizing these materials as depolarizers have been constructed, and they exhibit excellent discharge characteristics. They should, therefore, be useful for many military and commercial applications.

This application is a continuation of copending application U.S.N. 54,931, filed July 15, 1970 and now matured into U.S. Pat. No. 3,711,334.

The objects of this invention are to provide a novel organic electrolyte cell with:

(a) high voltage,
(b) high energy density,
(c) long shelf life,
(d) no spontaneous gassing under any circumstances.

It is a further object of this invention to provide a means for rendering useful in batteries a series of metal salts of the oxyacids of molybdenum which have not been useful in wet cells hitherto because of their intrinsic deficiencies in the existing systems.

Figure 1:
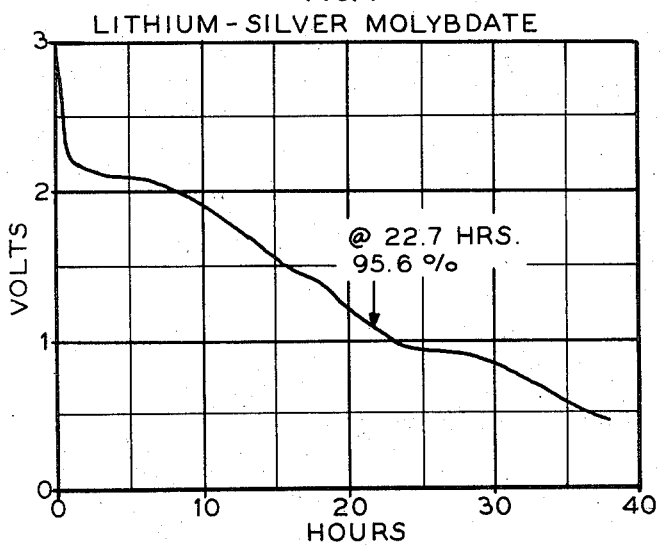
Figure 2:
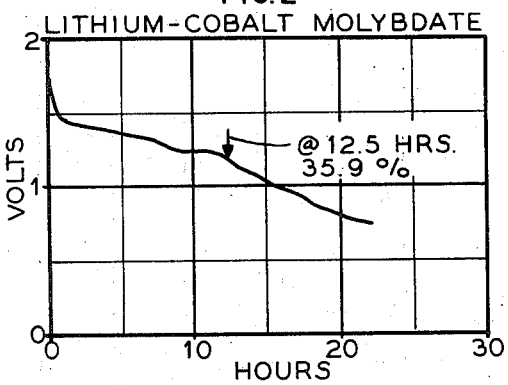
Figure 3:
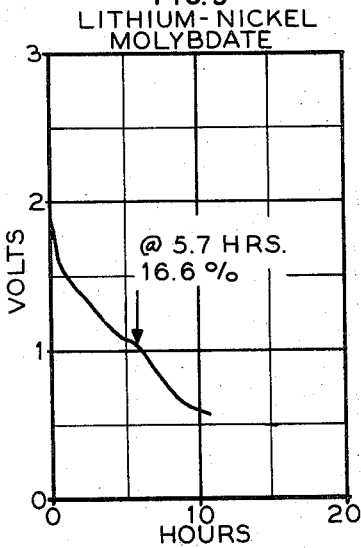
Figure 4:
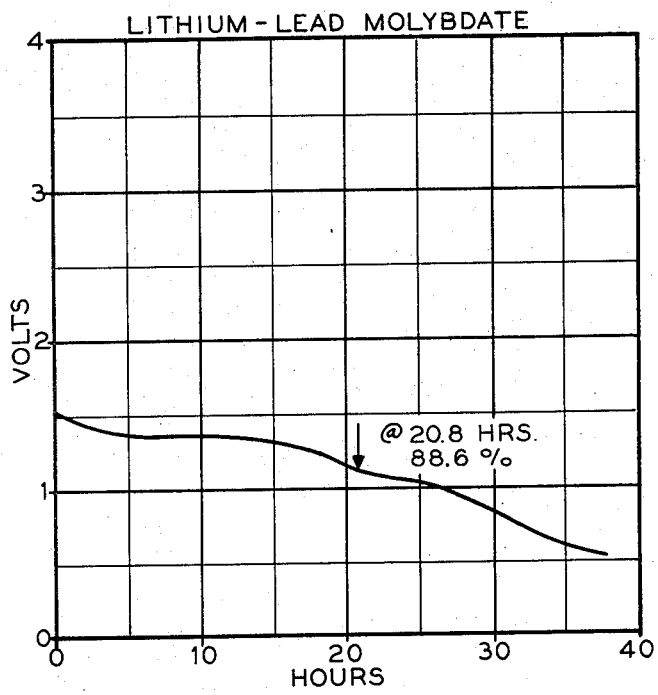
Figure 5:
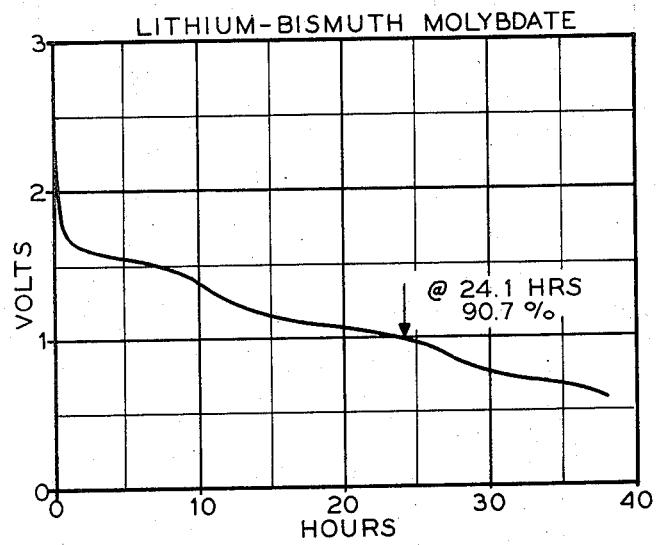

Now, referring to the drawings
FIG. 1 shows the typical discharge curve for a Li-Ag$_2$MoO$_4$ cell.
FIG. 2 shows the typical discharge curve for a Li-Co MoO$_4$ cell.
FIG. 3 shows the typical discharge curve for a Li-Ni MoO$_4$ cell.
FIG. 4 shows the typical discharge curvef for a Li-Pb MoO$_4$ cell.
FIG. 5 shows the typical discharge curve for a Li-Bi$_2$(MoO$_4$)$_3$ cell.

Generally speaking, this invention relates to a new class of materials suitable for use as depolarizers in wet cells. These materials consist of the metal salts of the oxyacids of molybdenum, materials hitherto unsuitable for such use. Cells exhibiting useful discharge characteristics have been constructed employing these materials in combination with organic electrolytes and light metal anodes, especially Li.

These lithium-metal molybdate cells were constructed using the procedures described in copending application U.S.N. 239,123 filed Mar. 29, 1972, now matured into U.S. Pat. No. 3,736,184.

The cells were constructed in parallel plate configuration using two rectangular lithium anodes (lithium ribbon pressed on stainless steel) placed on both sides of a rectangular cathode, using one layer of filter paper separator on each side.

In the cathode construction according to this aspect of the invention, the cathodes are fabricated by comprising a pre-mixed and pre-slugged mixture of powdered depolarizer and graphite in a 7:3 weight ratio with approximately 3 parts by weight of a binder. The preferred binder is 3% by weight of an aqueous dispersion of polytetrafluoroethylene, commonly known as colloidal Teflon® (Dupont de Nemours Co. Inc.). The water of this aqueous dispersion is then displaced by adding a sufficient amount of an organic solvent such as isopropanol, benzene, etc. to form a paste to the mix. The paste is then throughly mixed to form an easily pliable dough. Any excess solvent is decanted. The cathodes are molded on and around a nickel current collector, preferably fabricated from metal screening or expanded metal, by placing layers of the dough, above and below the current collector which is in turn placed in a rectangular die. The dough is then pressed at pressures of 70–80,000 lbs./in.$^2$. The excess solvent such as isopropanol is squeezed out of the dough and there results a compact rectangular cathode with adequate mechanical integrity for further treament. This cathode is then dried in air and preferably cured at a temperature between 200°–350° C. for from 1½ to 3 hours. Optimally the curing treatment is 300° C. for 2 hours. Although the curing process enhances the mechanical integrity of the cathode even further, these cathodes can be used without curing as well. The electrical conductivity of such a cathode is more than adequate for its purpose. In the above method, the ratio of active material to graphite or other conductive inert additive and the ratio of the total mix to binder can be varied widely.

The nature of the binder can also be varied to a considerable extent. The binder may include both organic and inorganic compounds. Organic binders in addition to the colloidal Teflon are polyethylene dissolved in xylene, ethyl cellulose dissolved in xylene, and so forth. Other polyolefin polymers may similarly be used. Inorganic binders which may be used include plaster of pairs and proprietary phosphate dental cements. The purpose of the pressure is to mechanically consolidate the cathode mixture. The preferred pressure is 70,000 lbs./in.$^2$.

When curing the cathodes, the curing temperature can be varied from 100° C. to 400° C. and the curing time should be varied according to the temperature with the curing time decreasing with increases in the temperature.

A corner of the cathode after the heat treatment according to the above procedure, is scraped to bare a portion of the current collector to which a tab is spot welded for electrical connection.

The cells were packaged in a foil laminate (aluminum foil laminated with polyethylene) bag with 1M LiClO$_4$ in tetrahydrofuran (THF) electrolyte and were heat sealed.

EXAMPLE 1

A lithium-silver molybdate cell was constructed using the above procedure. The positive electrode comprised a mixture of Ag$_2$MoO$_4$ and an electronically conductive diluent (graphite), and the electrolyte comprised 1M LiClO$_4$ in tetrahydrofuran. The open circuit voltage was 3.45 v. On load (4.5 ma. constant drain, 1.04 ma./cm.$^{-2}$ C.D.) the average operating voltage was 1.8 volts. The discharge curve is shown in FIG. 1. The theoretical energy density of the cell was found to be 412 w.hr./lb. The cathodic reaction was assumed to be:

$$Ag_2MoO_4 + 4Li^+ + 4e \rightarrow MoO_2 + 2Li_2O + 2Ag$$

The material utilization efficiency, based on the above reaction was 95.6% after 22.7 hours.

EXAMPLE 2

A lithium-cobalt molybdate cell was constructed, as in Example 1. The open circuit voltage was 3.23 v. On load (4.5 ma. constant drain, 1.04 ma./cm.$^2$ C.D.), the averagen operating voltage was 1.35 volts. The discharge curve is shown in FIG. 2. The theoretical energy density of the cell was found to be 632 w.hr./lb. The cathode reaction was assumed to be:

$$CoMoO_4 + 4Li^+ + 4e \rightarrow MoO_2 + 2Li_2O + Co.$$

The material utilization efficiency, based on the above reaction was 35.9% after 12.5 hours.

EXAMPLE 3

A lithium-nickel molybdate cell was constructed, as in Example 1. The open circuit voltage was 3.24 v. On load (4.5 ma. constant drain, 1.04 ma./cm.$^{-2}$ C.D.), the average operating voltage was 1.40 volts. The discharge curve is shown in FIG. 3. The theoretical energy density of the cell was found to be 634 w. hr./lb. The cathode reaction was assumed to be:

$$NiMoO_4 + 4Li^+ + 4e \rightarrow MoO_2 + 2Li_2O + Ni.$$

The material utilization efficiency, based on the above reaction was 16.6% after 5.7 hours.

EXAMPLE 4

A lithium-lead molybdate cell was constructed, as in Example 1. The open circuit voltage was 3.18 volts. On load (4.5 ma. constant drain, 1.04 ma./cm.$^{-2}$ C.D.), the average operating voltage was 1.35 v. The discharge curve is shown in FIG. 4. The theoretical energy density of the cell was found to be 388 w. hr./lb. The cathode reaction was assumed to be:

$$PbMoO_4 + 4Li^+ + 4e \rightarrow MoO_2 + 2Li_2O + Pb.$$

The material utilization efficiency, based on the above reaction was 88.6% after 20.8 hours.

EXAMPLE 5

A lithium-bismuth molybdate cell was constructed, as in Example 1. The O.C.V. was 3.14 v. On load (4.5 ma. constant drain, 1.04 ma./cm.$^{-2}$ C.D.), the average operating voltage was 1.30 v. The discharge curve is shown in FIG. 5. The theoretical energy density of the cell was found to be 463 w. hr./lb. The cathode reaction was assumed to be:

$$Bi_2(MoO_4)_3 + 12Li^+ + 12e \rightarrow 3MoO_2 + 6Li_2O + 2Bi$$

The material utilization efficiency, based on the above reaction was 90.7% after 24.1 hours.

In a like manner, it is believed that the molybdates of Fe, Hg and Tl can be used as depolarizers in organic electrolyte-light metal anode batteries.

THE SCOPE OF THE INVENTION

The invention is applicable to all primary cells with:

(1) light metal anodes, e.g., Li, Na, K, Al, Mg, Ca and Be
(2) organic solvents such as tetrahydrofuran, N-nitrosodimethylamine, dimethyl sulfite, propylene carbonate, dimethyl sulfoxide, dimethyl formamide, gamma-butyrolactone, dimethyl carbonate, methyl formate, butylformate, acetonitrile, dimethoxy ethane and the mixtures thereof.

(3) electrolytes comprising above solvents and all soluble salts of Li, Na, K, Mg, Be, Ca and Al. The perchlorates, hexafluorophosphates, tetrafluoroborates, tetrachloroaluminates, hexafluoroarsenates, of lithium are particularly suitable.

What is claimed is:

1. A high energy density cell comprising a positive electrode consisting of the molybdates of silver, cobalt, nickel, lead, bismuth, iron, mercury, thallium, and their mixtures; a negative electrode consisting of a light metal; said electrodes being disposed in an electrolyte comprising of tetrahydrofuran, N-nitrosodimethylamine, dimethyl sulfite, propylene carbonate, gamma-butyrolactone, dimethyl carbonate, dimethoxy ethane, acetonitrile, dimethyl sulfoxide, dimethyl formamide, and the mixtures thereof, and having dissolved therein soluble salts of the light metals.

2. The cell in claim 1 wherein the positive electrode comprises a mixture of said active materials with an electronically conductive diluent.

3. The cell in claim 2 wherein the electronically conductive diluent consists of graphite.

4. The cell in claim 2 wherein the negative electrode consists essentially of Li.

5. The cell in claim 2 wherein the positive electrode comprises a mixture of silver molybdate and an electronically conductive diluent.

6. The cell in claim 2 wherein the positive electrode comprises a mixture of cobalt molybdate and an electronically conductive diluent.

7. The cell in claim 2 wherein the positive electrode comprises a mixture of nickel molybdate and an electronically conductive diluent.

8. The cell in claim 2 wherein the positive electrode comprises a mixture of lead molybdate and an electronically conductive diluent.

9. The cell in claim 2 wherein the positive electrode comprises a mixture of bismuth molybdate and an electronically conductive diluent.

10. The cell in claim 1 wherein the soluble salts are selected from the group consisting of the perchlorates, the hexafluorophosphates, tetrafluoroborates, tetrachloroaluminates, and hexafluoroarsenates of the light metals.

11. The cell in claim 1 wherein the soluble salts are selected from the group consisting of the perchlorates, the hexafluorophosphates, tetrafluoroborates, tetrachloroaluminates, and hexafluoroarsenates of Li.

12. The cell in claim 4 wherein the electrolyte consists essentially of a solution of LiClO$_4$ in tetrahydrofuran.

References Cited

UNITED STATES PATENTS

| | | | |
|---|---|---|---|
| 3,658,592 | 4/1972 | Dey | 136—6 LN |
| 3,418,171 | 12/1968 | Popat | 136—24 X |
| 3,711,334 | 1/1973 | Dey et al. | 136—100 R |
| 3,415,687 | 12/1968 | Methlie | 136—100 R |
| 3,468,716 | 9/1969 | Eisenberg | 136—100 R |
| 3,502,506 | 3/1970 | Broyde | 136—120 FC |
| 3,262,817 | 7/1966 | Thompson | 136—86 D |

FOREIGN PATENTS

| | | | |
|---|---|---|---|
| 15,383 | 11/1889 | Great Britain | 136—24 |

ALLEN B. CURTIS, Primary Examiner

C. F. LeFEVOUR, Assistant Examiner

U.S. Cl. X.R.

136—100 R, 154